US006483311B1

(12) United States Patent
Ketterer et al.

(10) Patent No.: US 6,483,311 B1
(45) Date of Patent: Nov. 19, 2002

(54) METHOD AND DEVICE FOR EVALUATING IONIC CURRENT SIGNALS FOR ASSESSING COMBUSTION PROCESSES

(75) Inventors: Markus Ketterer; Klaus-Juergen Wald; Achim Guenther, all of Stuttgart; Juergen Foerster, Ingersheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,700

(22) PCT Filed: Mar. 16, 2000

(86) PCT No.: PCT/DE00/00822

§ 371 (c)(1),
(2), (4) Date: Dec. 1, 2000

(87) PCT Pub. No.: WO00/60327

PCT Pub. Date: Oct. 12, 2000

(30) Foreign Application Priority Data

Apr. 1, 1999 (DE) ........................................ 199 15 088

(51) Int. Cl.$^7$ .......................... F02P 17/00; G01L 23/22; F02D 41/00

(52) U.S. Cl. ...................... 324/388; 324/399; 73/35.05; 123/696

(58) Field of Search ................................ 324/388, 399; 123/479, 695, 696; 73/35.03, 35.05, 35.06

(56) References Cited

U.S. PATENT DOCUMENTS

| | | | | |
|---|---|---|---|---|
| 5,109,695 A | | 5/1992 | James et al. | |
| 5,396,176 A | * | 3/1995 | Ishii et al. | 324/388 |
| 5,945,828 A | * | 8/1999 | Katogi et al. | 324/399 |

FOREIGN PATENT DOCUMENTS

| | | |
|---|---|---|
| DE | 33 19 458 | 11/1984 |
| DE | 40 15 992 | 11/1991 |

* cited by examiner

*Primary Examiner*—N. Le
*Assistant Examiner*—Anjan K. Deb
(74) *Attorney, Agent, or Firm*—Walter Ottesen

(57) ABSTRACT

A method and an arrangement for detecting combustion misfires in internal combustion engines are presented where a measured ionic current signal is subjected to a floating short-time integration and a feature is formed which corresponds to the maximum value of the floating short-time integrator within the entire measuring window. The window length of the short-time integrator is shorter than the total measuring window and is floatingly displaced over the measuring window.

8 Claims, 7 Drawing Sheets

METHOD AND DEVICE FOR EVALUATING IONIC CURRENT SIGNALS FOR ASSESSING COMBUSTION PROCESSES

FIELD OF INVENTION

The invention relates to the evaluation of ionic current signals for judging combustion operations.

BACKGROUND OF INVENTION

In combustions, an ionization of the participating gases takes place because of chemical and physical processes. When a voltage is applied to two electrodes, which are insulated from each other and which project into the gas, a current can be measured which is carried by the ions in the gas chamber. This is referred to in the following as an ion flow.

For combustion processes in internal combustion engines, for example, in spark-ignition engines, it has long been attempted to utilize the ionic current for various engine control and diagnostic functions, for example, for knock detection, misfire detection, estimating combustion pressure and/or the position of pressure maximum, determination of mixture composition and detection of the lean running limit.

The spark plug is used conventionally as a measuring probe. After applying a voltage across the center electrode and ground, the ion flow can be measured after decay of the ignition spark. Apparatus possibilities for detecting ionic current signals in this context are disclosed, for example, in U.S. Pat. No. 5,220,821. The ionic current signal can be detected in the high voltage loop as well as in the low voltage loop of the ignition system.

The invention relates to method as well as apparatus aspects in combination with an extraction of features from the ionic current signal to evaluate the combustion.

The detection of combustion misfires is of primary concern.

A conventional method for detecting combustion misfires is the successive integration of the ionic current signal over a pregiven measuring window region. The integration value, which is obtained at the measuring window end, is applied as a feature for classification between combustions and misfires.

If disturbance components are superposed on the measured ionic current signal, then the disturbance distance deteriorates with increasing length of the integration window. To still make possible a classification at operating points with weak ionic current signals, the disturbances can, to a certain extent, be excluded by limiting the length of the integration window.

The possibility of the above-mentioned limiting is, however, limited by another effect, namely, the region in which an ionic current signal can be measured, can shift considerably in dependence upon the operating parameters (for example, engine speed, air/fuel ratio, et cetera). Long integration windows can be so positioned that they reliably include also the shifted regions. The mentioned limiting of the integration window leads, however, to the problem that the shortened windows, under circumstances, can no longer reliably include the above-mentioned regions or that the position of the shortened integration windows relative to the reference angle positions of the crankshaft and/or camshaft have to be adapted with much complexity to the conditions of individual engine types.

SUMMARY OF THE INVENTION

In this context, it is the object of the invention to provide an arrangement and a method for evaluating the ionic current signal with further increased reliability of the evaluation of the quality of combustion processes without increased adaptation complexity.

A significant feature of the invention is the substitution of a long integration region with a shorter integration region, which is so shifted in its position, that it covers the long integration region in combination with the displacement.

During the displacement, integration takes place repeatedly for short times and the value of the integrator is reset to a starting value with each new integration. The maximum value of the different results of the short-time integration obtained in this manner is used for the evaluation of the combustion quality, for example, for the detection of combustion misfires.

The method of the invention is characterized, on the one hand, in that the actual integration, in each case, can be limited to a short time duration. Because of the shortness, the noise component can be summed only to a limited extent. In this way, the method of the invention is robust compared to noise components, that is, insensitive.

On the other hand, the sliding displacement of the short time integration region over the entire monitoring time span of interest makes possible an adaption of the position of the integration region to the context conditions of an individual internal combustion engine type with advantageously low complexity.

Use signal components which project out of the noise are detected in one of the short-time integrations and can be identified by a subsequent maximum value selection. For this reason, the invention provides, in addition, the advantage of a high reliability in the evaluation of combustion quality, especially in the detection of combustion misfires.

This method supplies a significant improvement of the signal-to-noise ratio especially when signal noise (base noise) is present.

Investigations have, however, also shown that disturbance components having large amplitudes are present in the ionic current signal in addition to base noise and these components greatly disturb the method.

The large amplitudes of these disturbance components make it difficult to reliably distinguish between regular combustions and combustion misfires because these disturbances with successive integration provide values similar to combustions.

Combustion misfires which occur in parallel are then possibly no longer reliably detected. This can be observed especially at idle of the engine.

Because of statutory requirements, misfires must also be reliably detected in the idle region. In the context of a further embodiment of the invention, this is achieved via a suppression of short disturbance pulses in the processing of the ionic current signals.

Variations of the invention can be used alternatively or supplementary to the misfire detection also for the extraction of additional features for the recognition of running limits in leaning mixtures. The running limit is characterized by an increase of delayed combustions.

BRIEF DESCRIPTION OF THE DRAWINGS

In the following, embodiments of the invention are explained with reference to the figures.

DESCRIPTION OF THE PREFERRED EMBODIMENTS OF THE INVENTION

Figure 1:
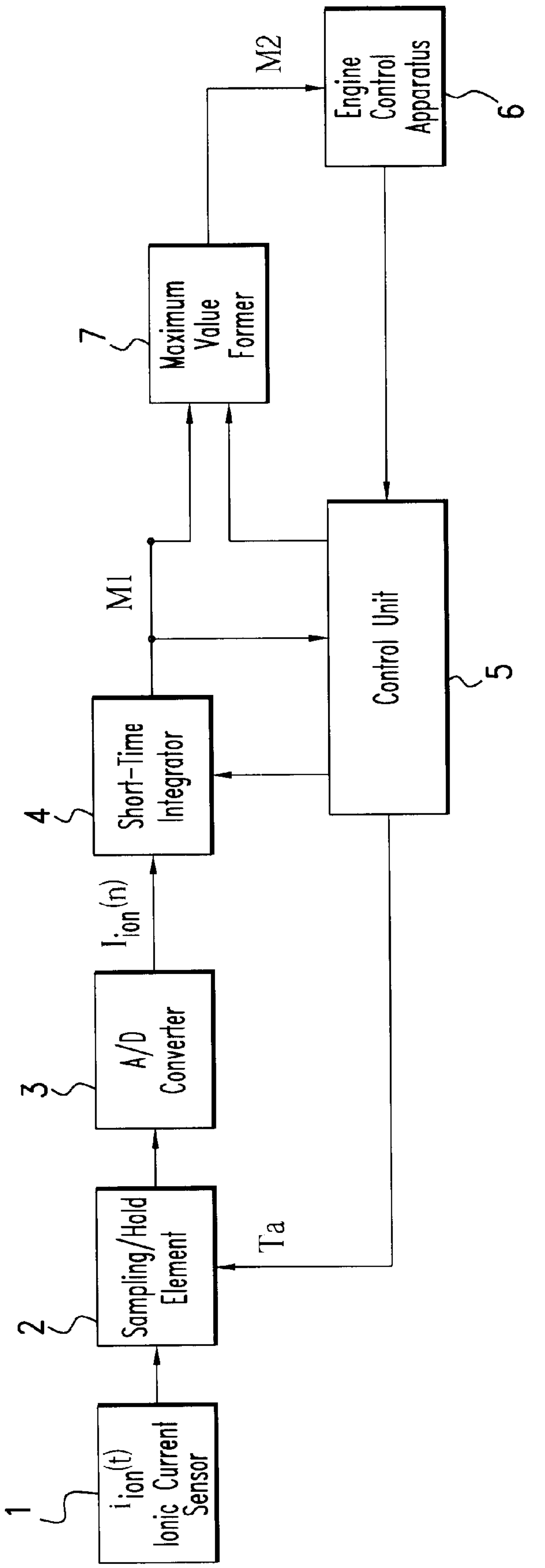
FIG. 1 shows an embodiment of an arrangement according to the invention.

In detail, FIG. 1 shows an ionic current sensor 1 which supplies a time-continuous ionic current signal $i_{ion}(t)$. This signal can be coupled out of the secondary loop as well as out of the primary loop of the ignition system of a spark-ignition engine. In both cases, the spark plug itself with its electrodes as well as the means for signal outcoupling, an ionic current sensor.

Reference numeral 2 represents a sampling/hold element for which the signal Ta gives the period of the sampling. The analog/digital converter 3 provides a digitalized result of the sampling as signal $I_{ion}(n)$. (n) numbers the clock sequence of the samplings so that:

$$I_{ion}(n)=i_{ion}(n_{ion}\cdot T_a)\ (T_a\text{=sampling period}) \qquad (1.1)$$

The sampled ionic current signal $I_{ion}(n)$ is thereafter supplied to a short-time integrator 4.

This integration takes place in accordance with the invention only in a relatively narrow time region of, for example, 5 ms but is continuously repeated with floating, further displaced integration start. The duration of this short-time integration window should align itself in accordance with the duration of the ionic current signal at the idle point. The following takes place by means of the control unit 5: the start of individual integration phases via enabling of the short-time integrator during active measurement window phases and the triggering of the erasure of internal condition memories at the short-time integrator and the maximum value former at the start of the active measurement window phases (reset). The control unit 5 receives corresponding signals from the engine control apparatus 6. Examples of such signals are the ignition time points and the crankshaft angle position signals.

Thereafter, the output signal of the short-time integrator 4 is supplied to a maximum value former 7.

The maximum value former selects, in accordance with the invention, the maximum, in magnitude, from the plurality of integration results formed by the continuous repetition and makes this maximum available as signal M2 to the engine control apparatus 6.

For a combustion misfire, the signal component of the ionic current of a regular combustion is not present so that a misfire can be detected from a comparatively too low value of the maximum M2.

In sampling systems with a fixed sampling frequency, an integration is usually simulated by the computation rule 1.2. The result of the integration of the ionic current signal in block 4 is identified in the following with the sign $M_1$ (feature 1).

$$M_1(n)=M_1(n-1)+T_a\cdot I_{ion}(n) \qquad (1.2)$$

Figure 2:
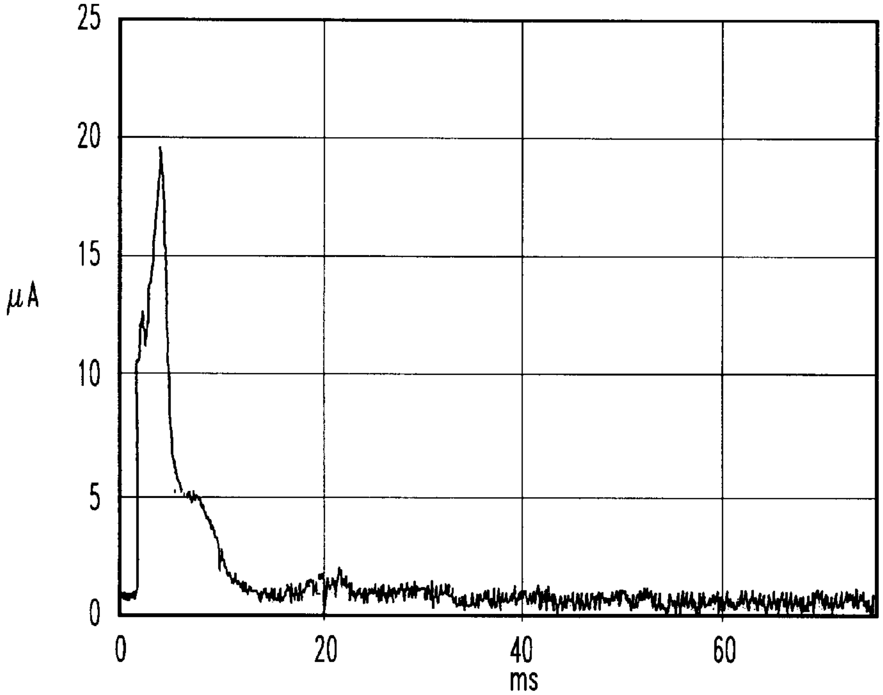
FIGS. 2 and 3 disclose time-dependent traces of ionic current signals for regular combustions and combustion misfires.
Figure 3:
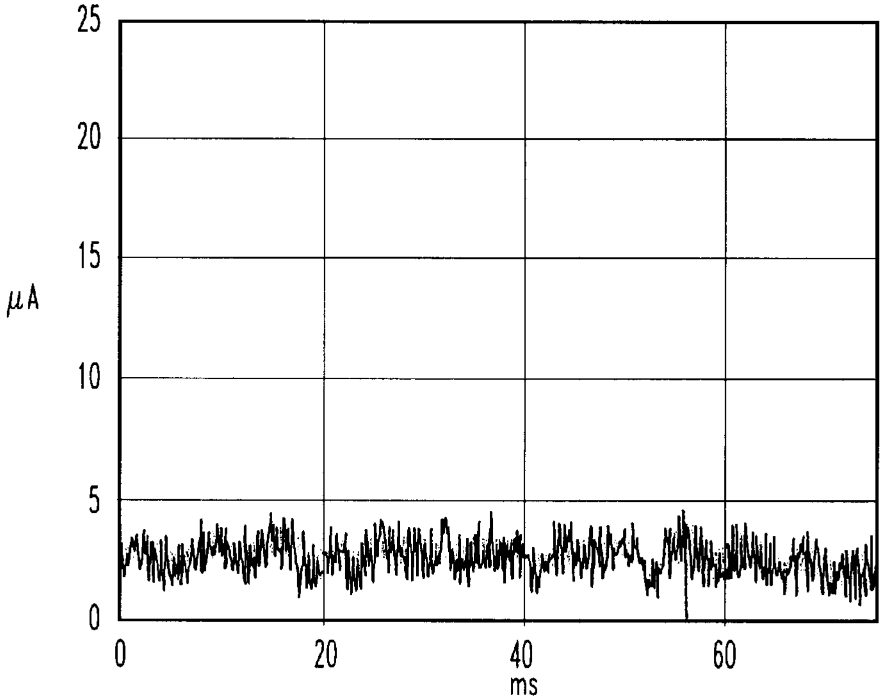

Correspondingly sampled ionic current signals are shown in FIGS. 2 and 3. The lobar-shaped trace in the signal of FIG. 2 signalizes a regular combustion; whereas, the omission of this lobar shape in the trace of the ionic current signal of FIG. 3 characterizes a combustion misfire. A clearly visible noise component is superposed on both signals.

Figure 4:
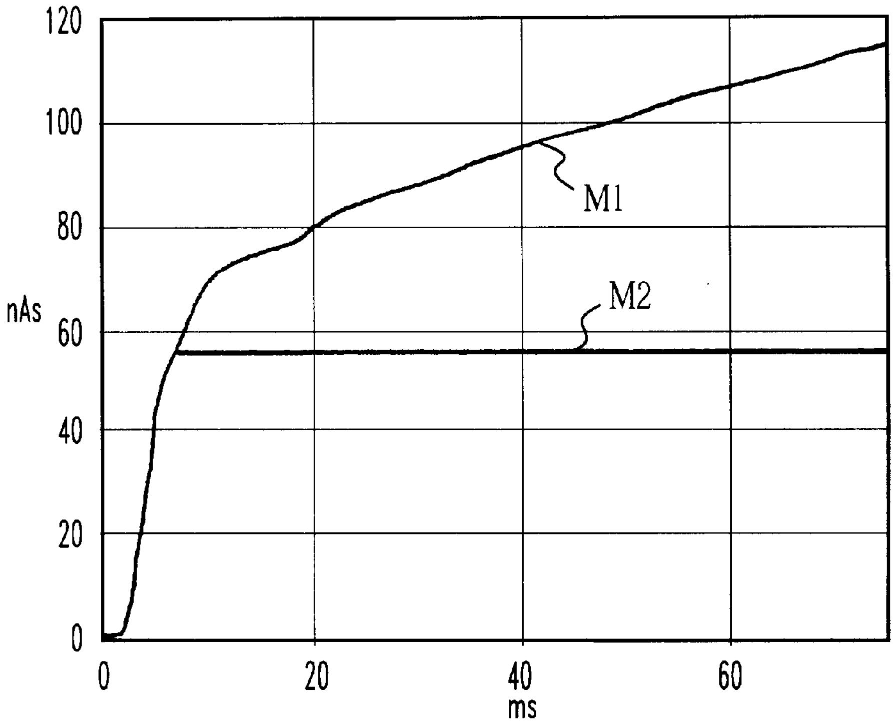
FIGS. 4 and 5 show traces of the time-dependent integral of the time-discrete ionic current signal for a regular combustion and for a combustion misfire.
Figure 5:
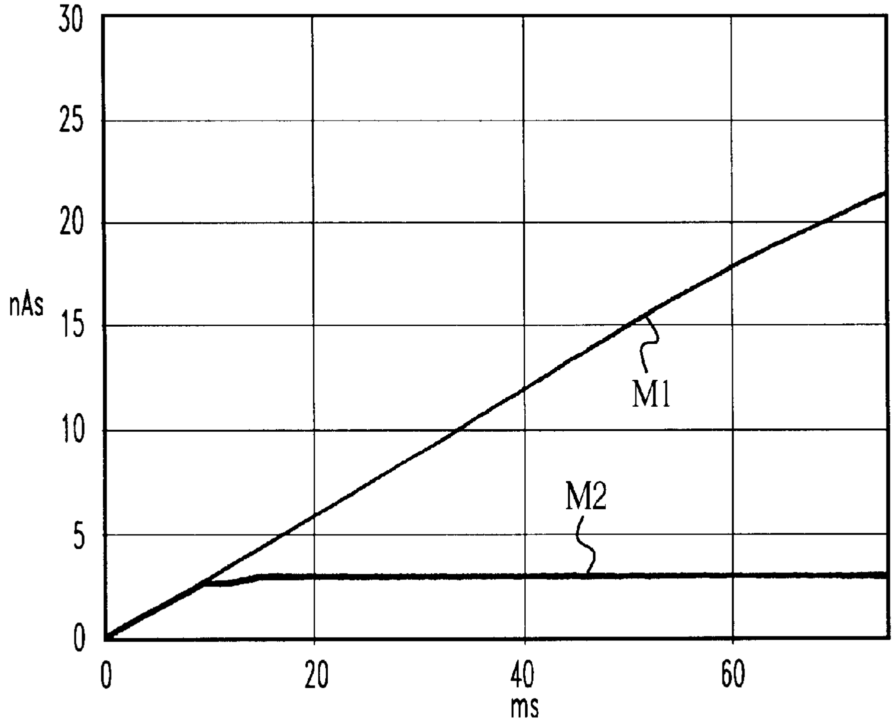

In FIGS. 4 and 5, the feature M1 for the two input signals of FIGS. 2 and 3 is shown with a dotted trace. It is here clearly recognizable how the noise component makes the integration value incorrect. As a comparison of FIG. 4 with FIG. 2 shows, the increase of the integration value for times greater than approximately 20 ms is exclusively caused by the noise component. In the case of the combustion (FIG. 4), the signal noise contributes to approximately 40% of the feature end value.

This disadvantage is avoided in the method of the invention for feature formation (see equation (1.3)) in that the integration window is limited in time to a duration of $D=N*T_a$. The value for N can, for example, be 20 and $T_a$ can, for example, amount to 250 ms. In order to nonetheless ensure a good ionic current detection in the total measurement window region, the integration window is, according to the invention, floatingly displaced across the measurement window. The results of the part integrals which occur in the computation clock n (that is, the individual sums in the following equation 1.3) are subsequently supplied to a maximum value former $F_{max}$. At the end of the measurement window, the maximum value former contains the feature $M_2$ according to the invention.

$$M_2 = F_{\max}\left(\sum_{i=0}^{D} K_1 \cdot I_{ion}(n-i)\right) \quad K_i = T_a \qquad (1.3)$$

The maximum value operator $F_{max}$, which is contained in the equation (1.3), follows the equation (1.4).

$$f(n)=F_{max}(s(n))=<^{f(n)=f(n-1)\ if\ s(n)>f(n-1)}_{f(n)=s(n)\ otherwise} \qquad (1.4)$$

In FIGS. 4 and 5, the traces of the feature values $M_2$, which are formed in accordance with the invention (solid lines), are shown in addition to the continuously integrated signals of FIGS. 2 and 3. It is clearly recognizable that the disturbance spacing $M_2$ is influenced only by the integration duration D but not by the length of the measurement window (time duration).

In the feature $M_2$ in accordance with the invention, the signal-to-noise ratio (ratio of the solid maximum value lines of FIGS. 4 and 5) between combustions and misfires lies at 18.5 (quotient) value. In contrast thereto, the signal-to-noise ratio for feature $M_1$ (end values of the broken line ionic current traces) lies only at 4.9.

In a further embodiment of the invention, the factors $K_i$ are determined in accordance with the equation (1.5). Then, the formed short-time integration value of the integration approximation corresponds to the chord-trapezoidal rule.

$$K_i=^{T_a/2\ for\ i\ \epsilon\{0,D\}}_{T_a}{}^{otherwise} \qquad (1.5)$$

The subdivision of the entire measurement window into many component integrals supplies data as to the time-dependent performance of the ionic current signal. Thus, the data as to the ignition delay, which is present, is contained in the number of the component integral, for which the difference to the previous component integral value lies, for the first time, above a specific threshold. This is so because the component integral wherein the corresponding integration window detects, for the first time, the increasing flank of the ionic current lobar, has a significantly greater value than the previous component integral. From the number of the component integral, the time-dependent position of the integration window and therefore the start of the ignition is clearly evident.

Figure 6:
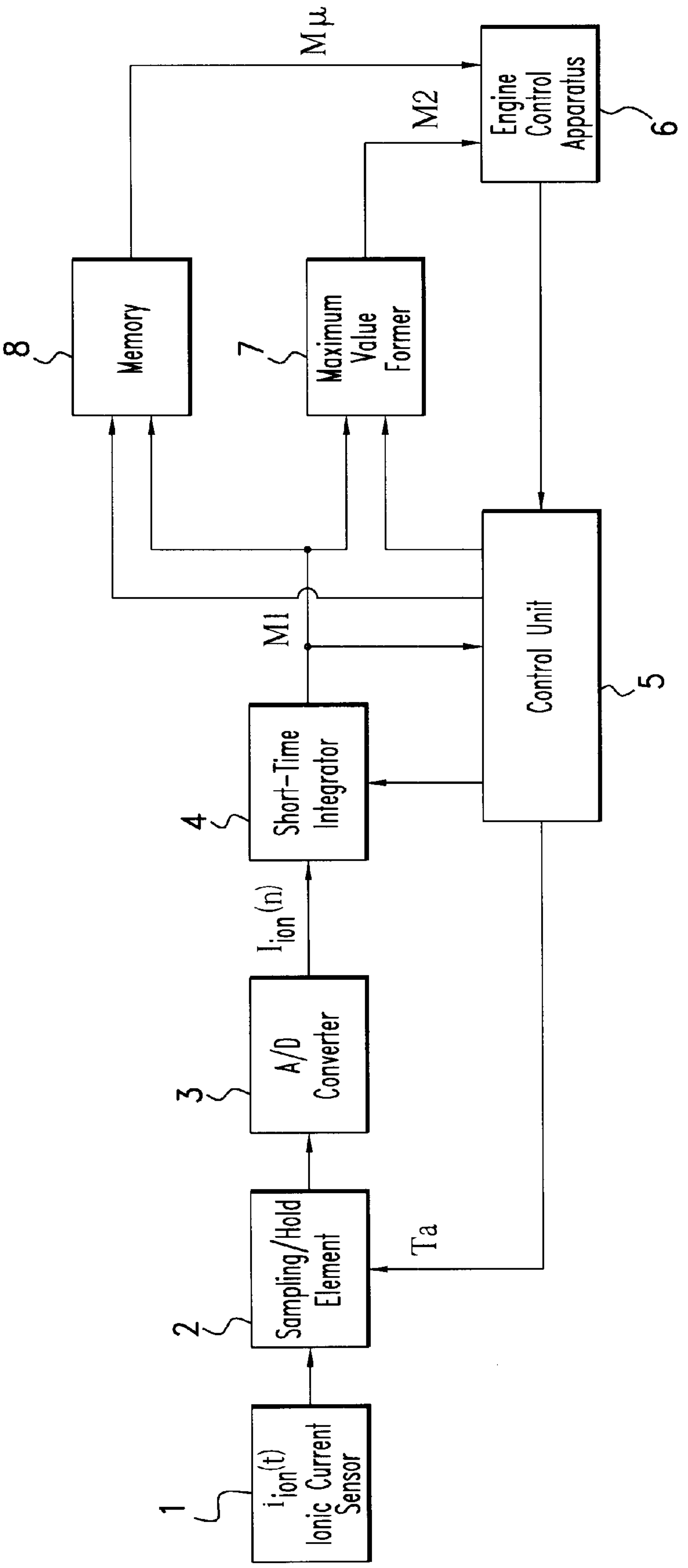
FIG. 6 shows another embodiment of the arrangement of the invention.

FIG. 6 presents an expanded variation of the invention. Here, the control unit 5 can cause the receipt of the output value of the short-time integrator 4 at selected time points (or occurrences) into a memory 8. These additional features $M_\mu$ are likewise supplied to the engine control apparatus 6 at the measurement window end, that is, after completion of the last component integration of a measuring window. These features contain data as to the time-dependent trace of the ionic current signal and are suitable to detect deviations in the combustion performance such as, for example, delayed combustions. In a delayed combustion, an ignition arc is generated but the subsequent flame front does not extend over the entire combustion chamber. Regions having an uncombusted air/fuel mixture remain which can be postcombusted at a later time point (to an extent time-dependent delayed). The reason for delayed combustions can, for example, be a mixture which is too lean.

Thus, for example, the number of the component integral wherein the component integration value exceeds a specific percentage of the maximum value $M_2$ for the last time, supplies the data as to whether a delayed combustion has taken place.

In one embodiment, the method of the invention is applied in time-discrete signal processing.

Especially for signal noises (base noises), this method supplies a clear improvement of the signal-to-noise ratio.

The investigations have also shown that additional typical disturbance components are present in the ionic current signal which greatly disturb the method. Such a case is shown in FIG. 7. In the ionic current signal (combustion misfire), three disturbance components are contained (at the signal start, at t=7 ms and at t=1.35 ms).

Because of the large amplitudes of these disturbance components, the feature value M2 in accordance with the invention (indicated in FIG. 7*b* with int_roh) could be made greatly erroneous. A reliable differentiation between regular combustions and combustion misfires is made difficult because, with the integration, these disturbances result in similar values as combustions. This has the consequence that parallelly occurring combustion misfires cannot be reliably detected. This deterioration of the detection reliability can be seen especially at idle of the engine.

Because of statutory requirements, misfires must also be reliably detected in the idle region. In the context of the invention, this is achieved by a suppression of short disturbance pulses in the processing of the ionic current signals.

The signal duration, which is short compared to a regular ionic current signal, is characterizing for the observed disturbance components, which, for example, can be caused by ignitions in other cylinders.

Figure 8:
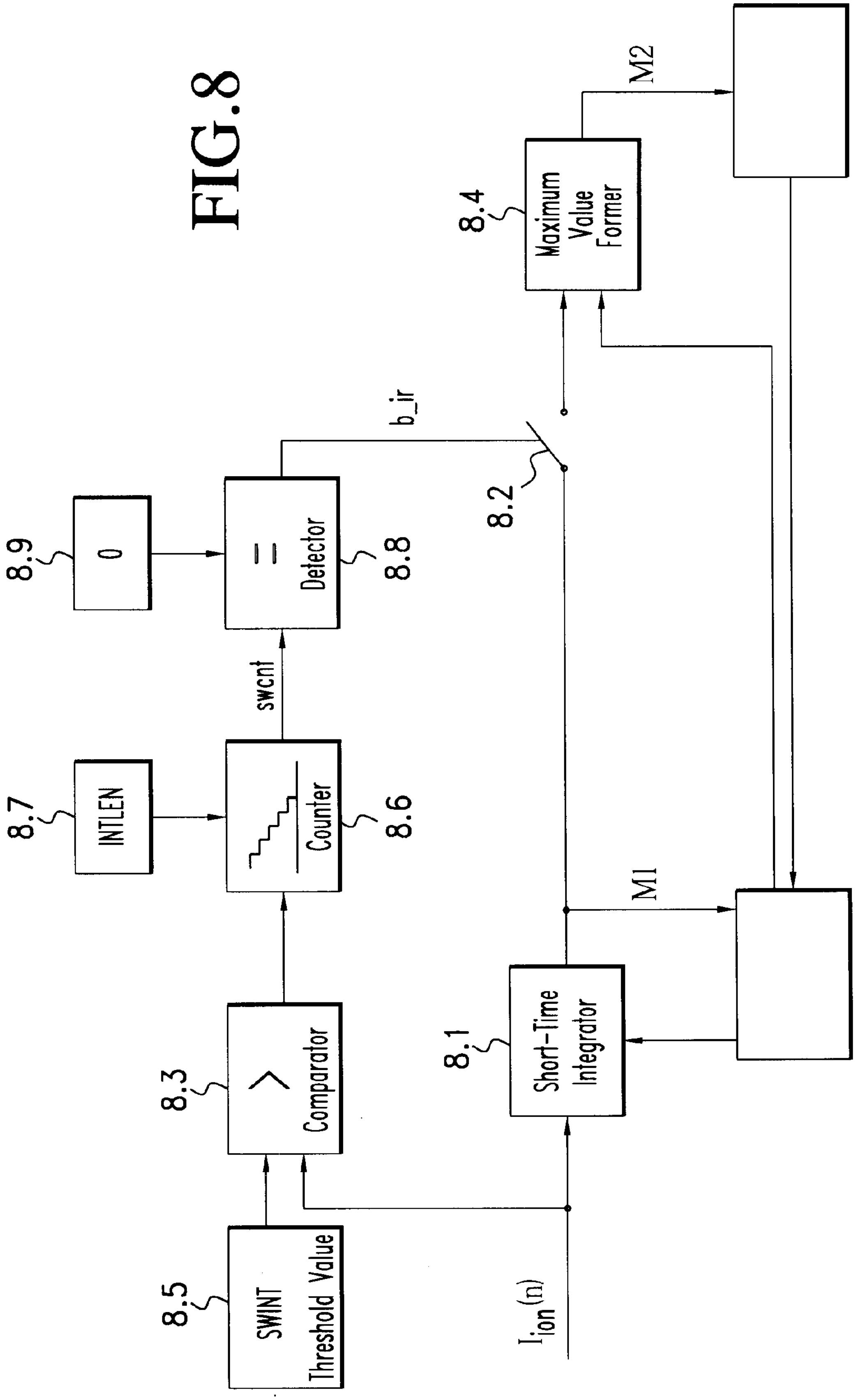
FIG. 8 shows a further embodiment of the invention in the form of a block circuit diagram.

For this reason, the supplementation of the method provides to use, in addition, this data in the formation of the feature value. In FIG. 8, the previous method including the supplementation is shown in the form of a block circuit diagram. Here, the functional blocks of the supplementation are arranged in the upper line.

The ionic current signal $I_{ion}$(n), which is sampled in the time raster $T_a$, is subjected to a floating summation in the short-time integrator 8.1 in accordance with equation (1.6).

$$\text{int\_k}(n) = \sum_{i=0}^{N-1} K_i \cdot I_{ion}(n-i) \tag{1.6}$$

int_k(n) corresponds essentially to the component integrals and/or the individual summands of the above-given equation 1.3. Block 8.1 then corresponds to the short-time integrator 4 of FIG. 1.

The further development of the method lies in that the short-term summation signal int_k(n) is not automatically supplied to a maximum value former 8.4. In FIG. 8, this is shown by the switch 8.2 (shown open) between the short-time integrator 8.1 and the maximum value former 8.4.

In lieu of the above, an enabling condition b_ir is computed in parallel therewith. Only when this condition is satisfied (b_ir=1), is the switch 8.2 closed and the short-time summation signal is supplied to the maximum value former.

For the computation of the enabling condition, the ionic current signal $I_{ion}$(n) is compared in block 8.3 to a threshold value SWINT made available by block 8.5. In each time step Ta in which the ionic current signal does not exceed this threshold, the value INTLEN from block 8.7 is supplied to a counter 8.6. In time steps Ta, wherein the ionic current signal exceeds the threshold, the counter is decremented by 1. Zero is the smallest possible counter value.

In these time steps Ta, wherein the counter value swcnt(n) is equal to zero, the enabling condition (b_ir=1) is set. The identity between the counter value swcnt(n) and the value zero is detected by block 8.8; the value zero is supplied from the block 8.9.

Stated otherwise, the processing of the ionic current signal in only then enabled when the ionic current signal remains above a threshold value for a longer time. In this case, block 8.3 forms the maximum int_roh(n) of the ionic current signal, for example, in accordance with the equation:

int_roh(n)=max(int_roh(n−1),int_k(n)), for b_ir=1=int_roh(n−1), for b_ir=0 int_roh(n) corresponds to the maximum of the viewed results of the short-time integration.

In FIGS. 7*a* to 7*d*, the operation of the expanded method is shown with reference to signal traces. In the concrete example, SWINT=3$\mu$A and INTLEN=3.

In all disturbance components 7.1, 7.2, the sampled ionic current values lie above the threshold value 7.3. Correspondingly thereto, the value of the counter swcnt is decremented.

However, the duration of the individual disturbance components is not adequate to decrement the counter to zero. For this reason, the enabling condition is never satisfied, that is, b_ir continuously has the value zero. For this, see FIG. 7*c*.

Figures 7A, 7B, 7C, 7D:
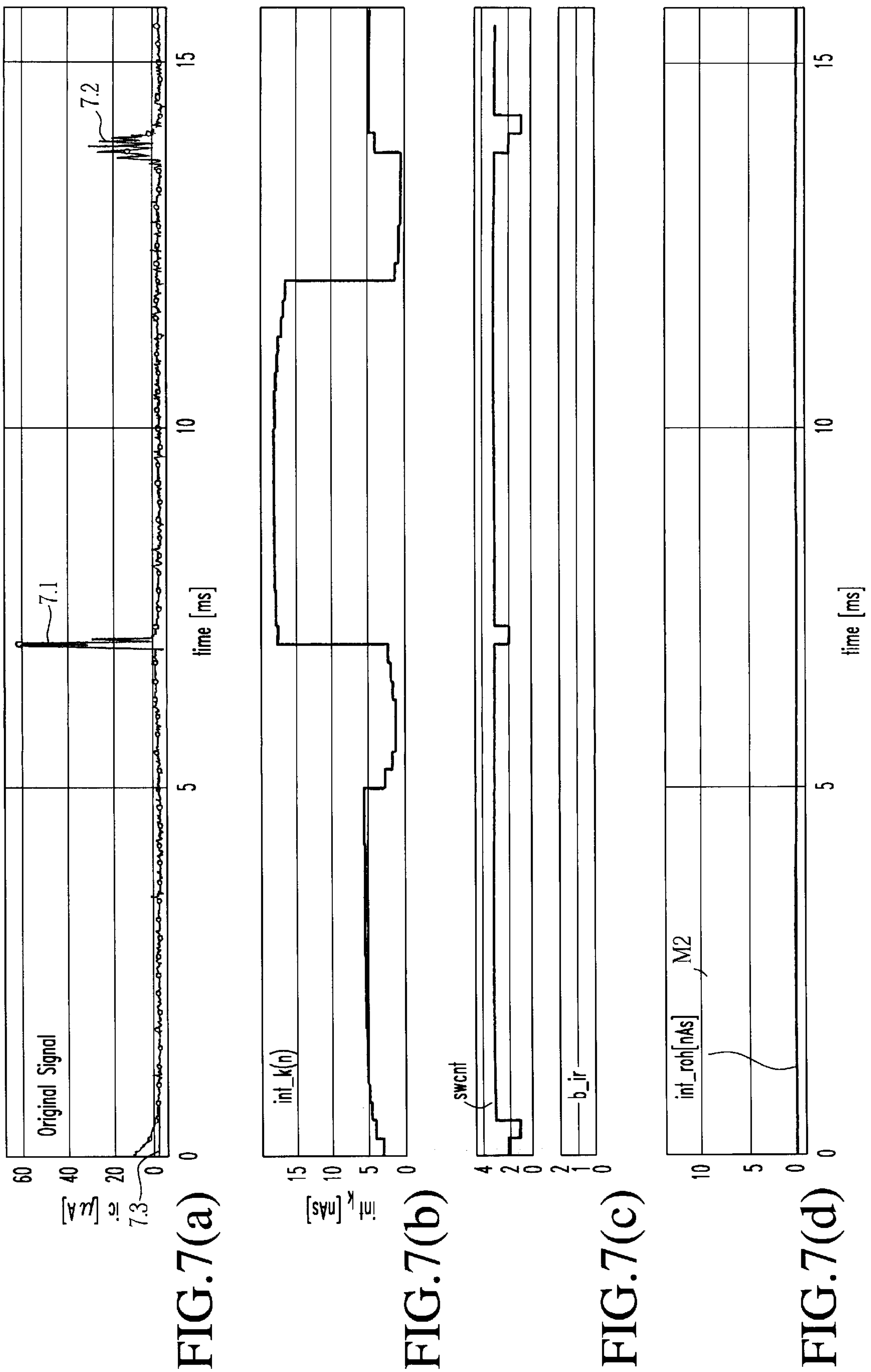
FIG. 7*a* shows further typical disturbance components in an ionic current signal which occur additionally to the noise.
FIGS. 7*b* to 7*d* show signals which occur in combination with a further embodiment of the invention.

The feature end value int_roh is equal to M2 and has, in this case, exactly the value zero (FIG. 7*d*).

In FIG. 9, the method is again illustrated with respect to a regular ionic current signal (combustion).

The ionic current lobar 9.1 appears already in the scaling of FIG. 9 and corresponds to a regular combustion. In this case, several sequentially sampled ionic current values lie clearly above the threshold.

Figures 9A, 9B, 9C, 9D:
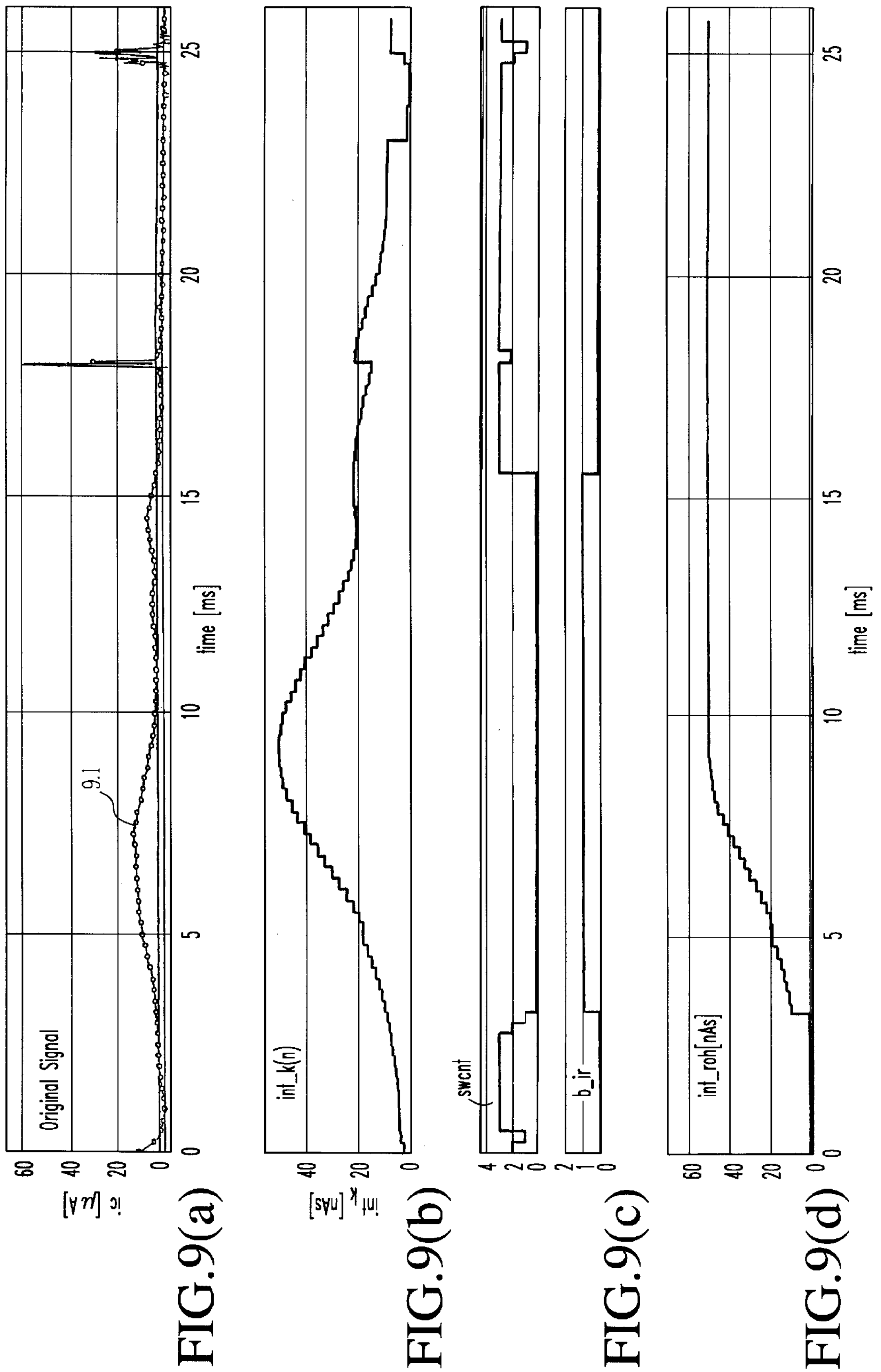
In FIG. 9 the method is again illustrated with respect to a regular ionic current signal (combustion).

The counter swcnt in FIG. 9*c* reaches the value zero within INTLEN time rasters whereupon the enabling condition is satisfied (swcnt=0, b_ir=1) and the maximum value in FIG. 9*d* is correspondingly actualized.

All values of the ionic current signal are still contained in the short-time integrator (summation window is longer than delay time for the integration enablement). For this reason, the feature value for combustions is not changed with this expansion of the method.

For engines with a correspondingly strong ionic current signal, the method of claim 1 can be applied also without this expansion described with respect to FIGS. 7, 8 and 9.

We claim:

1. A method for detecting combustion misfires in an internal combustion engine, the method comprising the steps of:

subjecting a measured ionic current signal to a floating short-time integration using a floating short-time integrator;

forming a feature which corresponds to the maximum value of the floating short-time integrator within the entire measuring window with said short-time integrator having a window length shorter than said entire measuring window; and, floatingly displacing said window length over said measuring window.

2. The method of claim 1, comprising the further step of detecting the value of said short-time integrator at specific time points or occurrences for a further evaluation.

3. The method of claim 1, comprising the further steps of:

after subjecting the measured ionic current signal to a floating short-time integration, supplying the output value of said short-time integrator to a maximum value former as soon as an enabling condition is satisfied;

recognizing said enabling condition as being satisfied when said ionic current signal has continuously exceeded an adjustable threshold value for an adjustable time duration; and, immediately withdrawing said enabling condition when there is a drop below said threshold value.

4. The method of claim 1, wherein said threshold value and said time duration are dependent upon engine and physical peripheral conditions including engine speed, load and ionic current amplitude.

5. An arrangement for detecting combustion misfires in an internal combustion engine, the arrangement comprising:

means for subjecting a measured ionic current signal to a floating short-time integration using a floating short-time integrator;

means for forming a feature which corresponds to the maximum value of the floating short-time integrator within the entire measuring window with said short-time integrator having a window length shorter than said entire measuring window; and, means for floatingly displacing said window length over said measuring window.

6. The arrangement of claim 5, comprising means for detecting the value of said short-time integrator at specific time points or occurrences for a further evaluation.

7. The arrangement of claim 5, comprising:

means for supplying the output value of said short-time integrator to a maximum value former as soon as an enabling condition is satisfied after having subjected said measured ionic current signal to a floating short-time integration;

means for recognizing said enabling condition as being satisfied when said ionic current signal has continuously exceeded an adjustable threshold value for an adjustable time duration; and, means for immediately withdrawing said enabling condition when there is a drop below said threshold value.

8. The arrangement of claim 5, wherein said threshold value and said time duration are dependent upon engine and physical peripheral conditions including engine speed, load and ionic current amplitude.

* * * * *